United States Patent
Sato

(10) Patent No.: US 8,427,939 B2
(45) Date of Patent: Apr. 23, 2013

(54) MPLS TUNNEL IDENTIFICATION METHOD AND DEVICE

(75) Inventor: Masahiro Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 462 days.

(21) Appl. No.: 12/577,828

(22) Filed: Oct. 13, 2009

(65) Prior Publication Data

US 2010/0054264 A1 Mar. 4, 2010

Related U.S. Application Data

(63) Continuation of application No. PCT/JP2007/059322, filed on May 1, 2007.

(51) Int. Cl.
*H04L 12/26* (2006.01)

(52) U.S. Cl.
USPC ............ 370/225; 370/410; 709/227; 709/239

(58) Field of Classification Search .................. None
See application file for complete search history.

(56) References Cited

U.S. PATENT DOCUMENTS

| | | | |
|---|---|---|---|
| 7,974,202 B2 * | 7/2011 | Solomon | 370/235 |
| 2002/0101868 A1 | 8/2002 | Clear et al. | |
| 2003/0131131 A1 * | 7/2003 | Yamada et al. | 709/238 |
| 2006/0062218 A1 | 3/2006 | Sasagawa | |
| 2007/0286090 A1 * | 12/2007 | Rusmisel et al. | 370/252 |

FOREIGN PATENT DOCUMENTS

| | | |
|---|---|---|
| JP | 2002-247083 | 8/2002 |
| JP | 2003-209562 | 7/2003 |
| JP | 2006-129359 | 5/2006 |
| WO | 20051006670 | 1/2005 |

OTHER PUBLICATIONS

Luca Martini et al. Encapsulation MEthods for Transport of Ethernet Frames over IP/MPLS Networks, published Jan. 2005.*
Notification of Reason for Refusal dated Feb. 8, 2011, from the corresponding Japanese Application.
International Search Report dated Jun. 12, 2007, from the corresponding International Application.
L. Martini, et al. "Pseudowire Setup and Maintenance Using the Label Distribution Protocol (LDP)" RFC 4446, Apr. 2006.

* cited by examiner

*Primary Examiner* — Brian Roberts
(74) *Attorney, Agent, or Firm* — Katten Muchin Rosenman LLP

(57) ABSTRACT

According to an aspect of the invention, an MPLS tunnel identification method includes: establishing MPLS tunnels with an opposing node by distributing an MPLS tunnel label; and determining an MPLS tunnel to be associated with a pseudo wire corresponding to a pseudo wire label among the MPLS tunnels when the pseudo wire label is assigned from the opposing node thereby to notify identification information of the MPLS tunnel together with identification information of the pseudo wire to the opposing node.

7 Claims, 13 Drawing Sheets

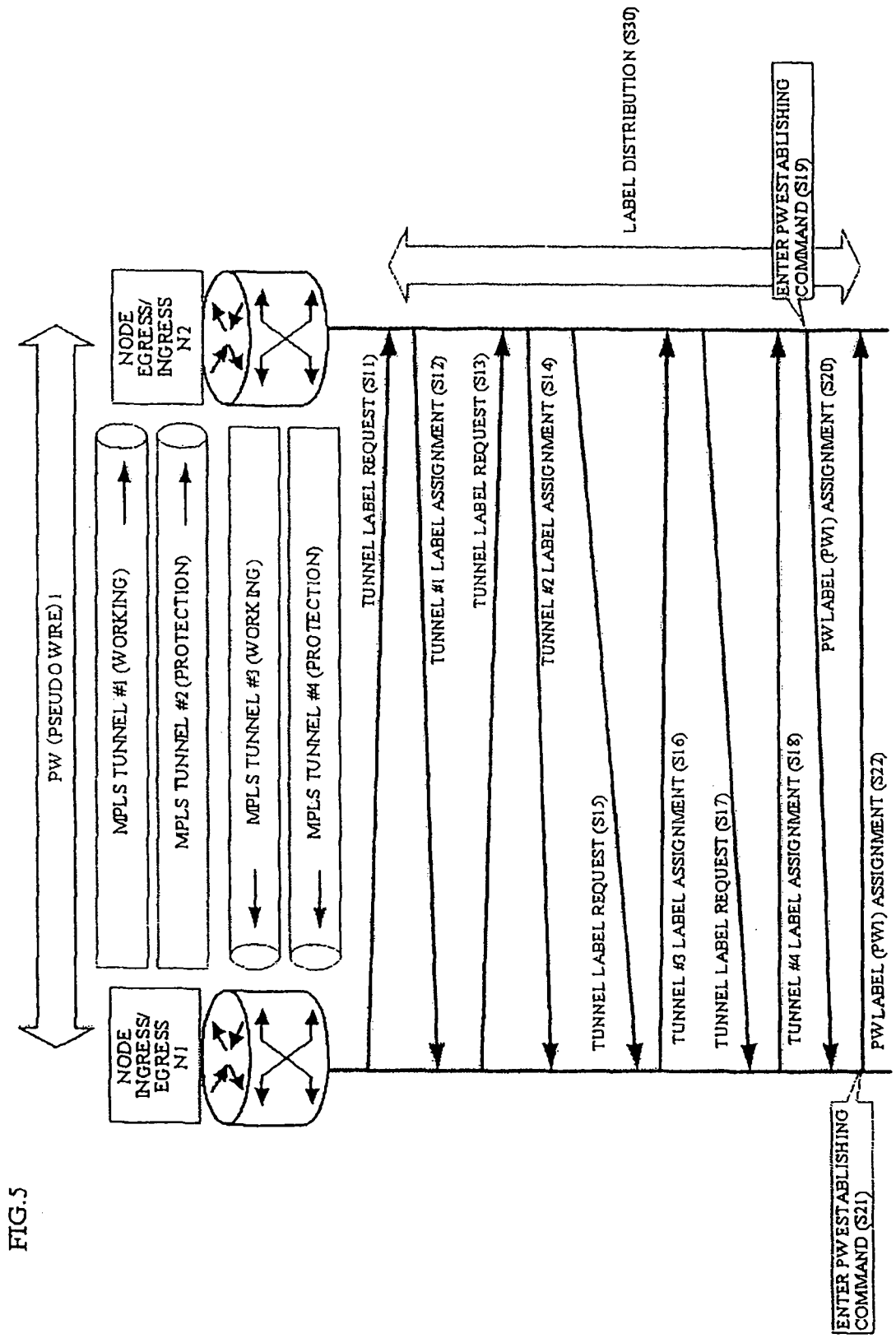

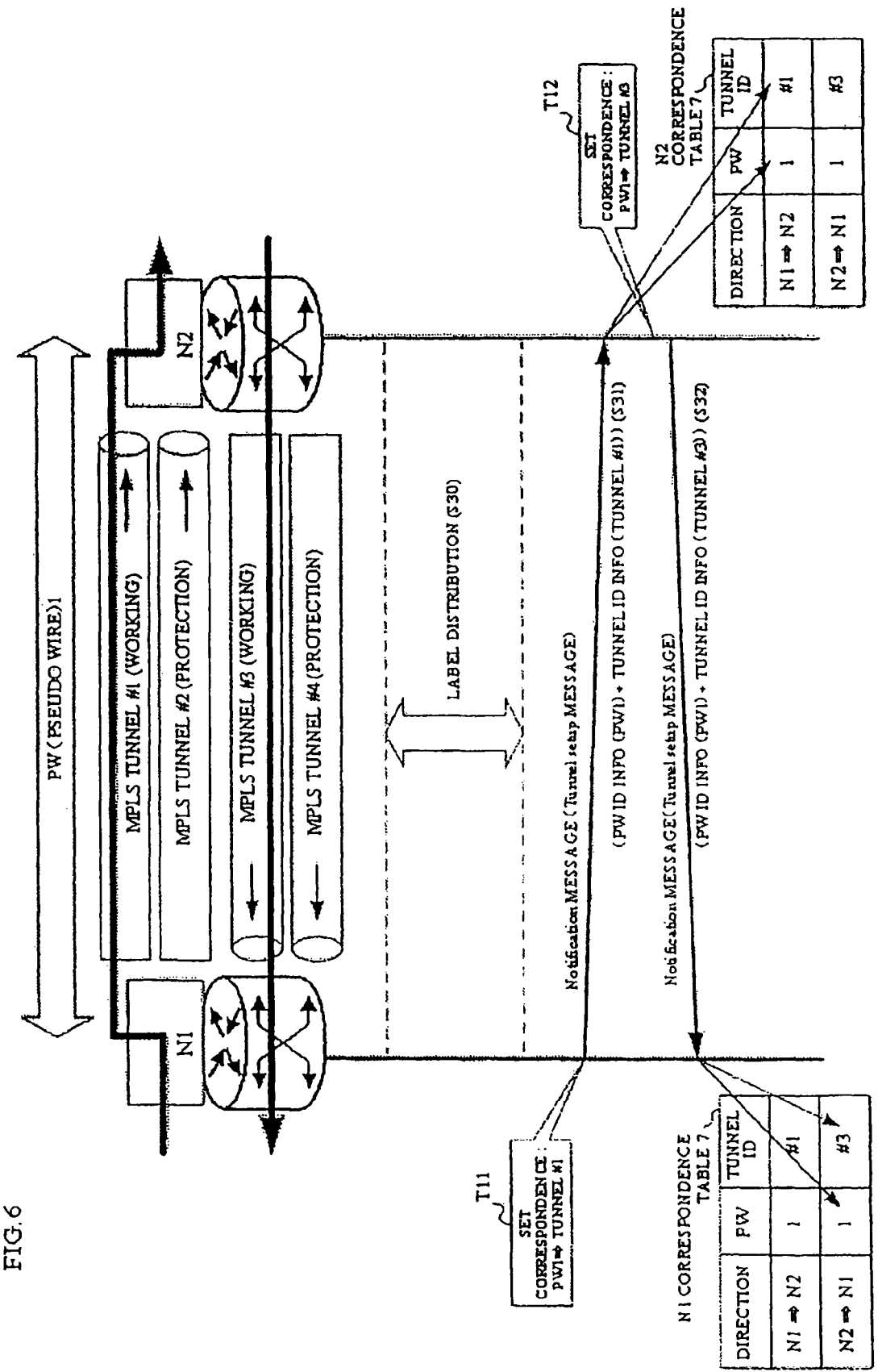

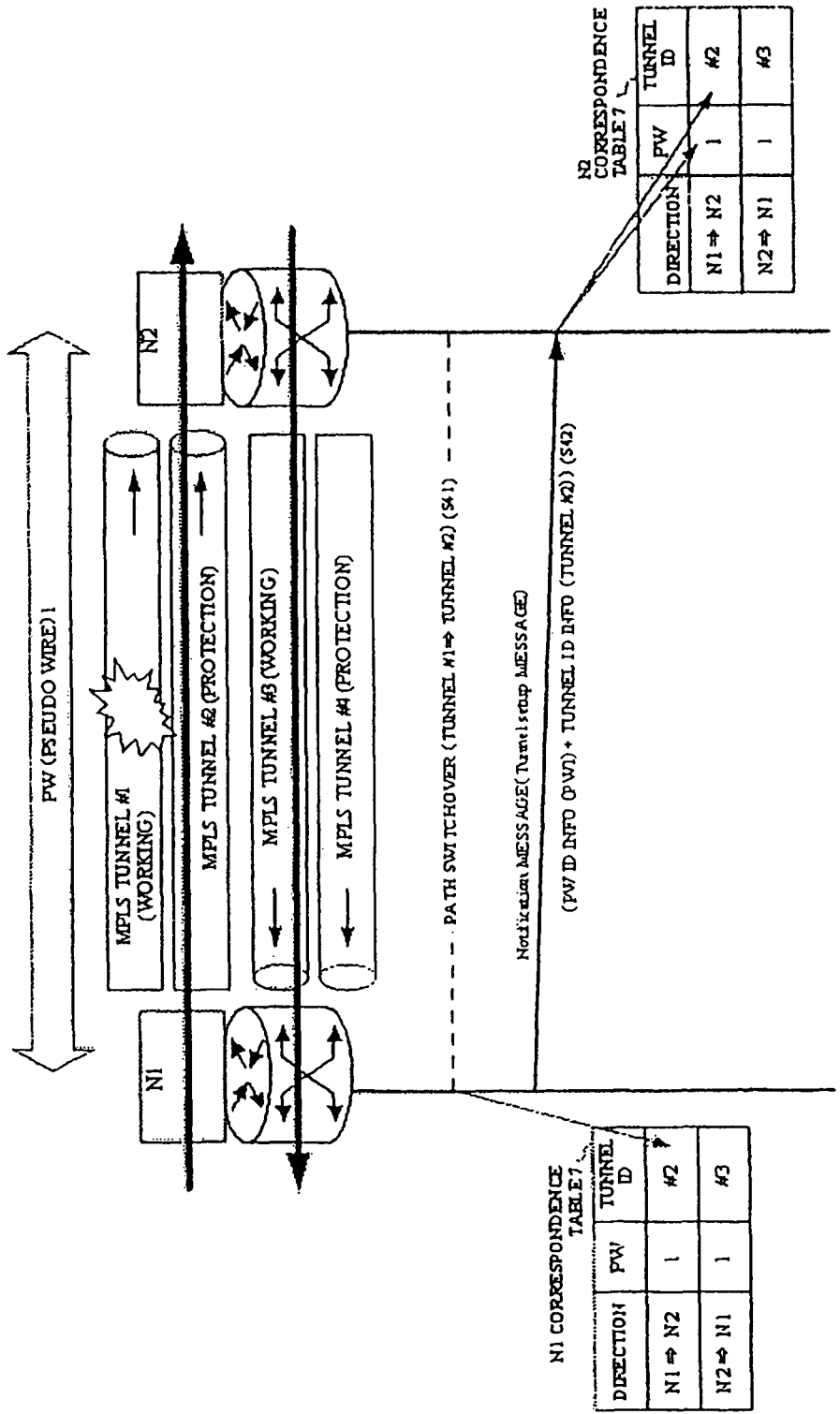

MPLS TUNNEL IDENTIFICATION METHOD AND DEVICE

CROSS-REFERENCE TO RELATED APPLICATION

This application is a continuation of International Application PCT/JP2007/59322 filed on May 1, 2007, the contents of which are herein wholly incorporated by reference.

BACKGROUND

1. Field

The present invention relates to an MPLS tunnel identification method and device, and in particular to a method and device for identifying an MPLS tunnel used in combination with a pseudo wire.

2. Description of the Related Art

A pseudo wire (hereinafter, occasionally abbreviated as PW) is, as shown in FIG. 11, a means for offering line services such as Ethernet (registered trademark), ATM (Asynchronous Transfer Mode) and FR (Frame Relay) over an MPLS (Multi-Protocol Label Switching) network NW that is a single packet network, and is utilized as a method for realizing L2VPN.

Establishment (setup) of an MPLS tunnel (hereinafter, occasionally referred to simply as tunnel) and establishment of a pseudo wire are individually performed by using signaling (PW signaling) processes between a node (ingress node or ingress router) $N_I$ and a node (egress node or egress router) $N_E$ forming the MPLS network NW and respectively connected to customer edges CE. Mapping (combination/correspondence) of pseudo wires and MPLS tunnels is set by "Provisioning" only in the ingress node $N_I$. Therefore, the egress node $N_E$ can not identify the correspondence (associated relationship) between the pseudo wires and the MPLS tunnels, so that monitoring the PW layers can not be performed only by monitoring the tunnel layers, incurring the following problems:

It is necessary to support OAM operations by pseudo wire in a pseudo wire layer, consuming a large bandwidth with control packets, with a result of a high load as the number of pseudo wires increases;

In the event of a tunnel layer's fault, the egress node $N_E$ having detected the tunnel fault can not identify a pseudo wire influenced by the tunnel fault, requiring a considerable time for a link down transfers.

In order to solve such a problem, there has been proposed a method wherein tunnel identification (ID) information is added to a label notification message of pseudo wire thereby to enable the egress node $N_E$ to identify the correspondence.

A related art system for thus enabling the egress node to identify a correspondence between pseudo wires and tunnels is shown in FIG. 12. For the preparation of pseudo wires, the nodes $N_I$ and $N_E$ respectively perform a label distribution for determining tunnel labels and PW labels (step S110).

Namely, upon establishing MPLS tunnels, the ingress node $N_I$ sends a label request to the egress node $N_E$ (step S100), which responsively assigns a label (step S101). Upon establishing PW labels, the egress node $N_E$ notifies a PW label to the ingress node $N_I$ with a PW label message (step S102).

The PW label message is added with PW identification information (INFO), so that it can be identified as a message relating to PW1 from the identification information. This message is notified to the ingress node $N_I$ with being also added with identification information of a tunnel (tunnel #2 in the example shown) through which PW1 is desired to be passed, so that the ingress node $N_I$ passes PW1 through the tunnel notified, thereby enabling the egress node $N_E$ to identify the correspondence.

As a reference example, there is a VLAN tunneling protocol, in which a packet is tunneled via a label-switched path (LSP) according to an MPLS protocol; at a second switching node from the last of the LSP, the present label value is replaced by a label value reserved for a packet transmitted from a port associated with the VLAN; an egress switching node of the LSP receives a packet of the label value reserved and identifies that VLAN information is embedded in the packet to extract the destination address to be transmitted to the last destination (see e.g. Japanese patent application publication 2002-247083 (US 2002/0101868A1)).

In the related art shown in FIG. 12, the notification of the tunnel identification information is performed only at the time of transmission of the PW label notification message (step S102). Therefore, as shown in FIG. 13, when a working tunnel #1 is switched over to a protection tunnel #2, the egress node $N_E$ can not identify the correct correspondence.

Namely, at the time of preparing a pseudo wire, the tunnel identification information notified together with the PW label information (PW1) indicates the tunnel #1 (working tunnel), with the result that the egress node $N_E$ identifies the correspondence between PW1 and the tunnel #1 (from PW1 to the tunnel #1). When the tunnel #1 for example is faulted and switched over to the tunnel #2, the egress node $N_E$ does not perform the label assignment and the notification of the tunnel identification information to the ingress node $N_I$, so that the correspondence is not newly updated (step T10), resulting in the above problem left.

Thus, the above related art system has not taken into account a case where the correspondence between pseudo wires and MPLS tunnels is dynamically changed such as a case where a protection (backup) tunnel is established.

SUMMARY

According to an aspect of the invention, an MPLS tunnel identification method includes: establishing MPLS tunnels with an opposing node by distributing an MPLS tunnel label; and determining an MPLS tunnel to be associated with a pseudo wire corresponding to a pseudo wire label among the MPLS tunnels when the pseudo wire label is assigned from the opposing node thereby to notify identification information of the MPLS tunnel together with identification information of the pseudo wire to the opposing node.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIG. 5 is a sequence diagram (part 1) showing an operation (1) of an MPLS tunnel identification method and device as above noted;

FIG. 6 is a sequence diagram (part 2) showing an operation (1) of an MPLS tunnel identification method and device as above noted;

FIG. 8 is a sequence diagram showing an operation (2) of an MPLS tunnel identification method and device as above noted;

DESCRIPTION OF THE EMBODIMENTS

Figure 3:
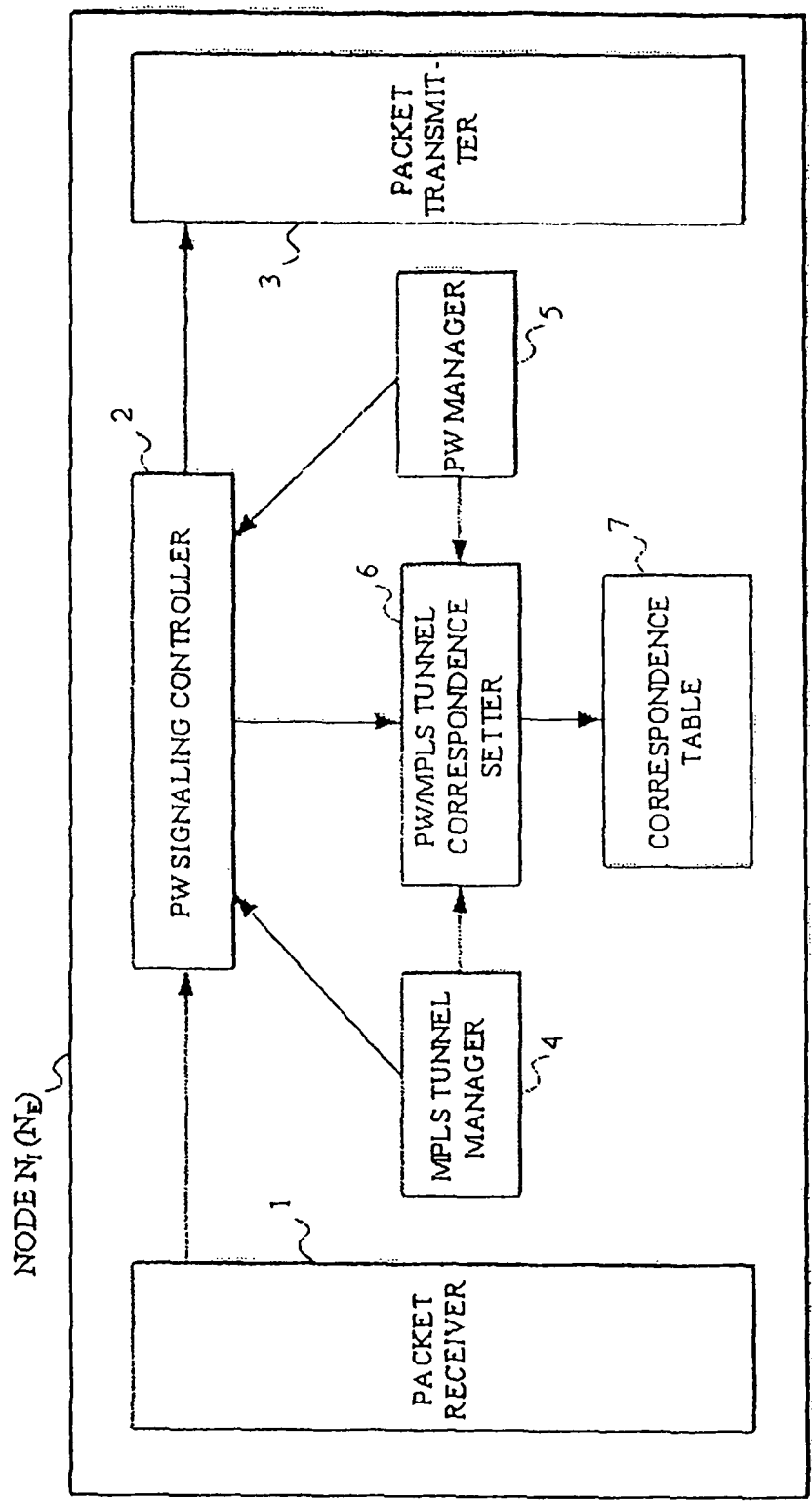
FIG. 3 is a block diagram showing an arrangement of an MPLS tunnel identification method and device as above noted.

Node Arrangement [1]: FIG. 3

Figure 1:
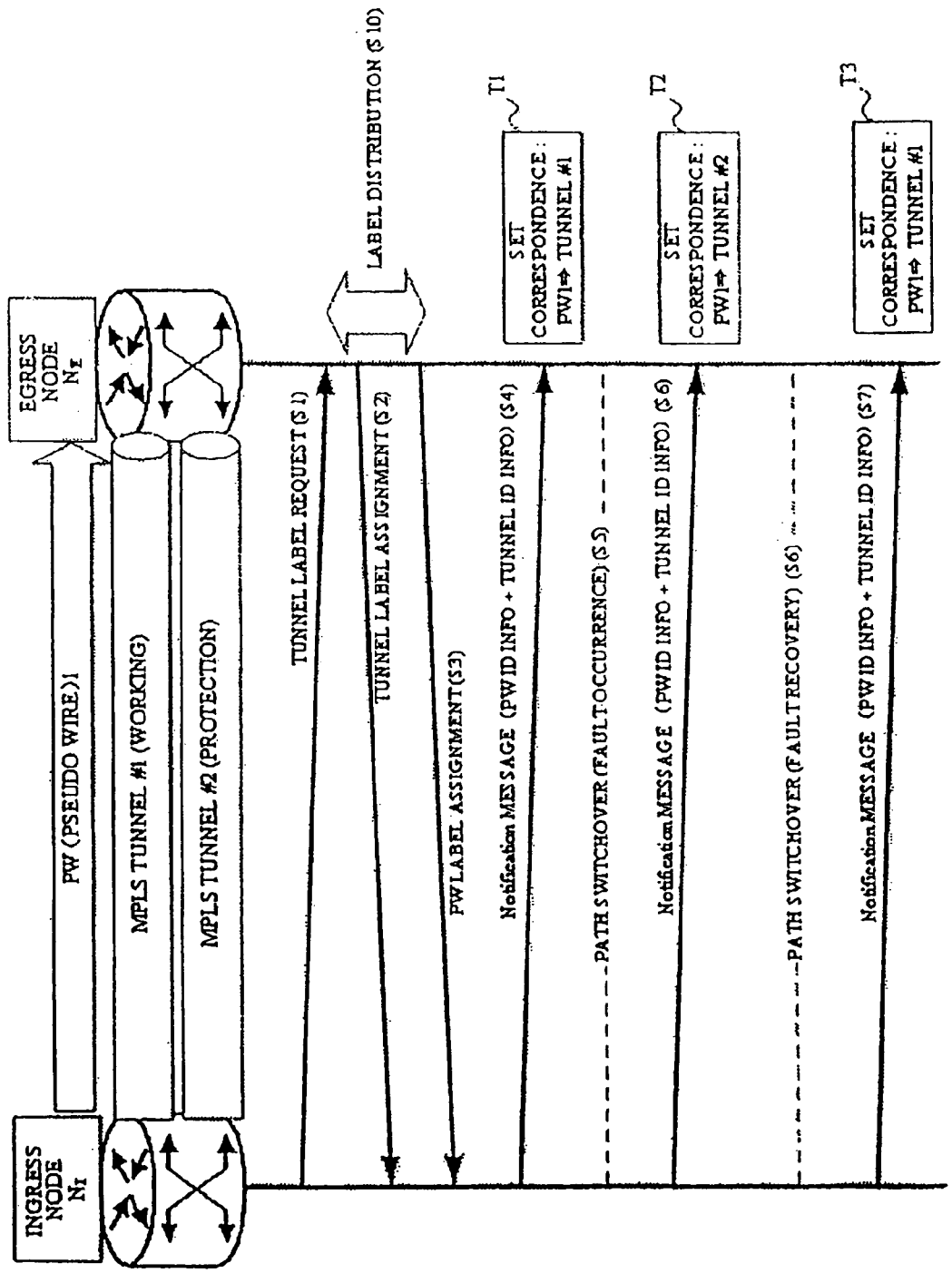
FIG. 1 is a sequence diagram showing an operation concept (1) of an MPLS tunnel identification method and device as above noted.
Figure 2:
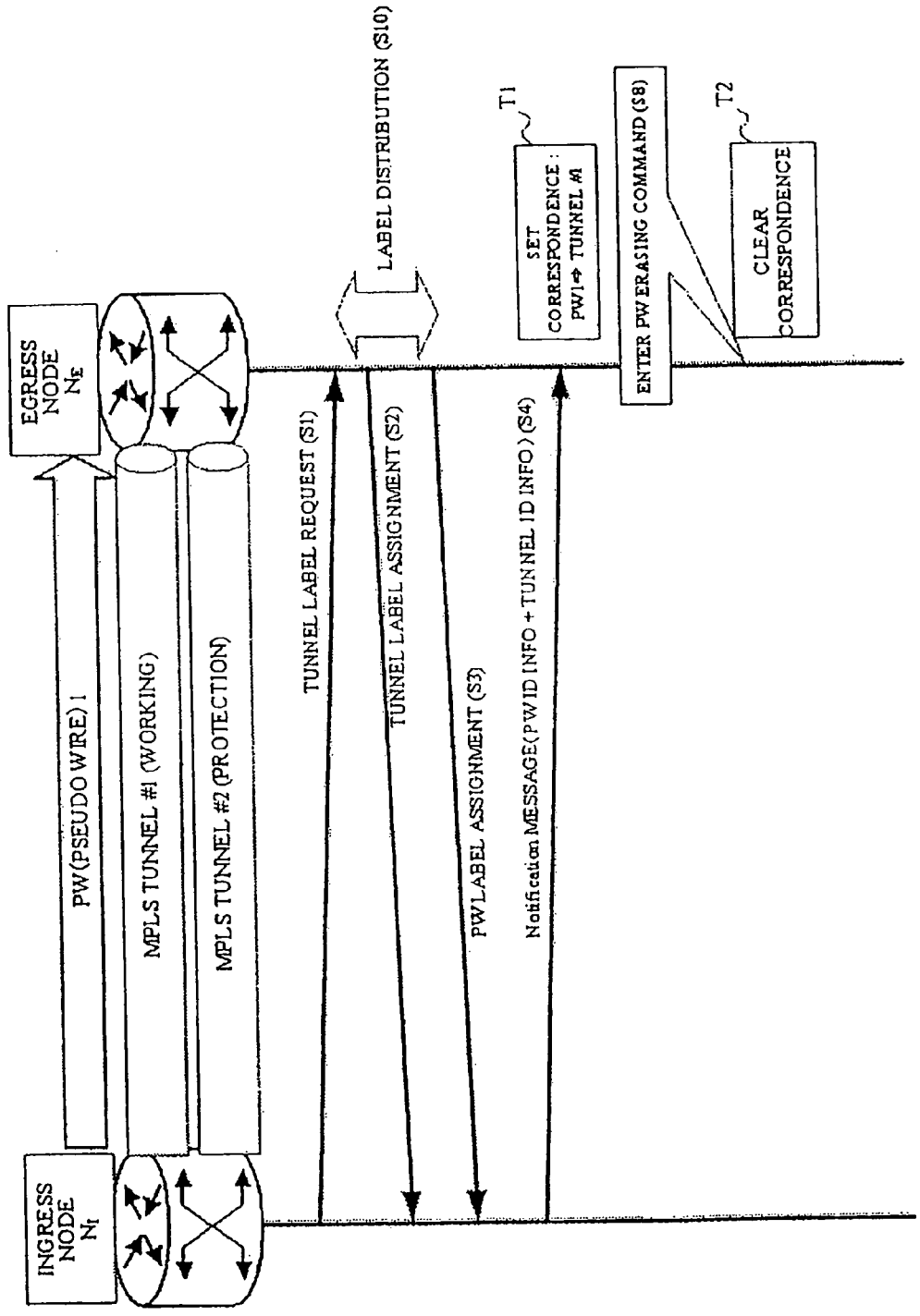
FIG. 2 is a sequence diagram showing an operation concept (2) of an MPLS tunnel identification method and device as above noted.

FIG. 3 shows one embodiment of a device for implementing an MPLS tunnel identification method according to the present invention, in which this device corresponds to the ingress node $N_I$ or egress node $N_E$ shown in FIGS. 1 and 2. This node $N_I$ or $N_E$ comprises a packet receiver 1 which receives a packet from an opposing node, a PW signaling controller 2 which manages a PW signaling control for a packet received by the packet receiver 1 and a packet transmitter 3 which transmits a packet from the PW signaling controller 2 to the opposing node.

The PW signaling controller 2 receives identification information of MPLS tunnels from an MPLS tunnel manager 4 and identification information of pseudo wires from a PW manager 5 to perform the PW signaling control including label distributions and transmissions of the "Notification" message. The PW signaling controller 2 further provides PW labels and MPLS tunnel labels to a PW/MPLS tunnel correspondence setter 6, which receives the MPLS tunnel labels from the MPLS tunnel manager 4 and the PW labels from the PW manager 5 thereby to make a correspondence table 7 store a correspondence between PW identification information and tunnel identification information and to refer to the correspondence table 7 as well.

Figure 4:
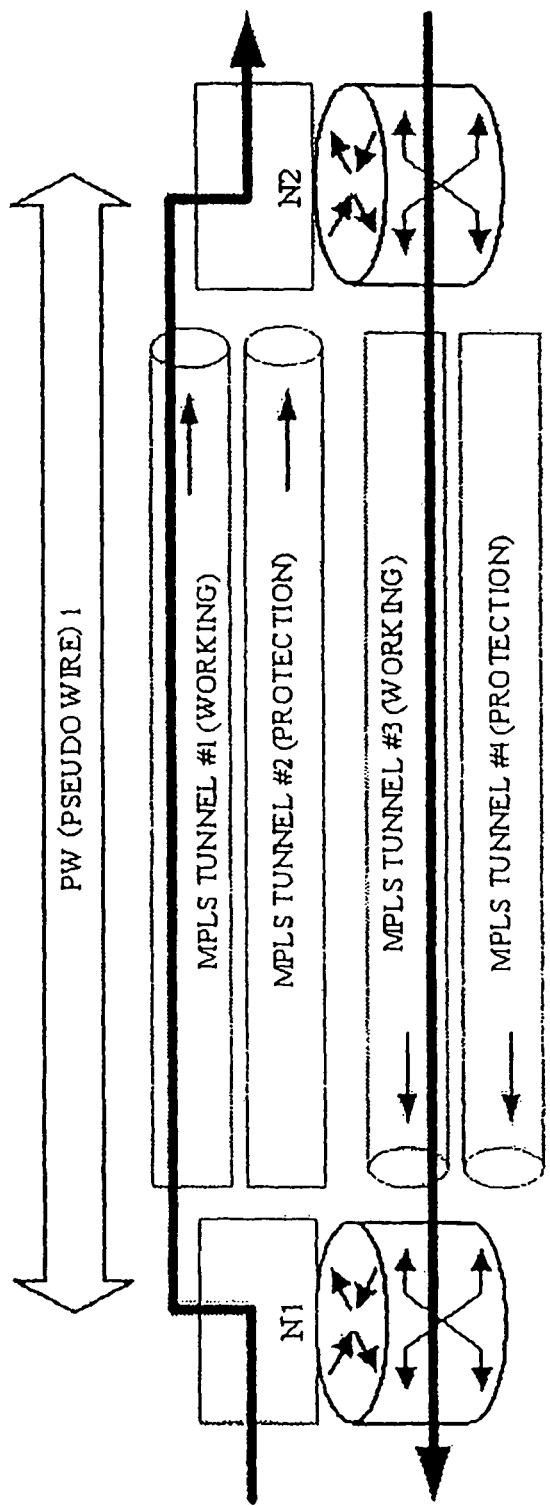
FIG. 4 is a diagram showing an establishment example for an MPLS tunnel according to the above noted MPLS tunnel identification method and device.

Tunnel Establishment Example: FIG. 4

It is now assumed that as a tunnel establishment example, a bi-directional pseudo wire PW1 is established between the nodes N1-N2 as shown in FIG. 4. As an MPLS tunnel passing therethrough the PW1, the node N1 assumes the ingress node and the node N2 assumes the egress node to establish the tunnel #1 and #2 in the direction from the node N1 to N2 while the node N2 assumes the ingress node and the node N1 assumes the egress node to establish the tunnel #3 and #4 in the reverse direction from the node N2 to N1. In either direction, the working tunnels #1 and #3 are respectively provided with the protection tunnels #2 and #4, where upon occurrence of a fault the working tunnels are to be switched over to the protection tunnels.

Hereinafter, operations of the above arrangement will be described.

Operation (1): FIGS. 5 and 6

For the initial establishment of a pseudo wire, the label distribution of pseudo wires and tunnels is performed in either direction between the nodes N1-N2 as shown in FIG. 5 (step S30). The label distribution of tunnels including a protection tunnel is performed twice for each single direction. The establishment of the tunnels #1-#4 is made by transmitting the respective label requests from an upstream node (ingress node) to a downstream opposing node (egress node) (steps S11, S13, S15, S17) to assign the tunnel labels to the upstream node from the downstream node (step S12, S14, S16, S18).

Then, the assignment of PW labels is made to the upstream node (step S20 and S22) upon entering a PW establishing command (step S19 and S21). The label distribution operations are performed by the PW signaling controller 2 in FIG. 3.

At the end of the label distribution operations (step S30), the correspondence setter 6 for the nodes N1 and N2 sets the correspondence between pseudo wires and tunnels in the table 7 as shown in FIG. 6 (step T11, T12), so that the notification of identification information of the pseudo wire and identification information of the tunnel passing therethrough the pseudo wire is made with the "Notification" message to the opposing node.

Figures 7A, 7B:
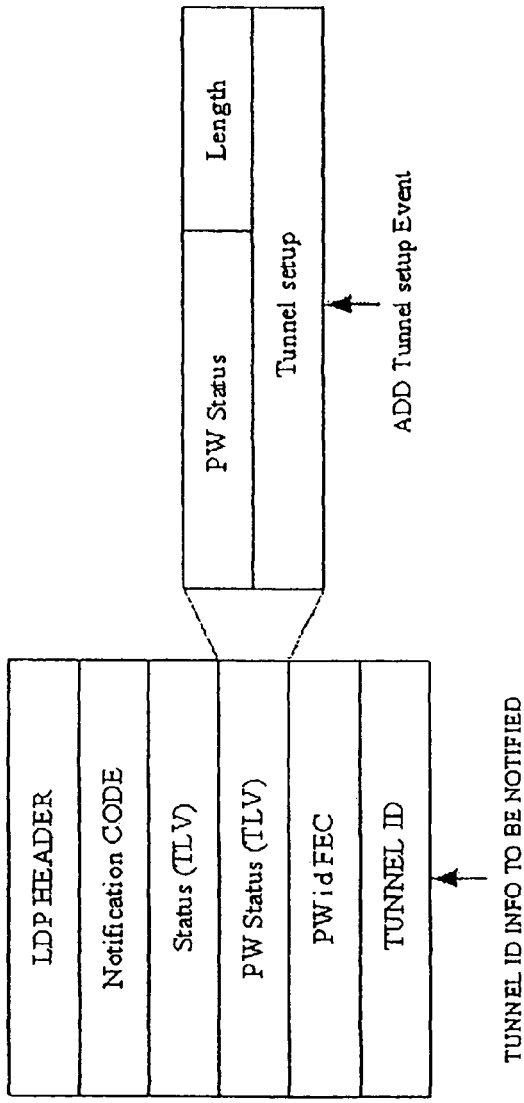
FIGS. 7A and 7B are format diagrams showing a "Notification" message used for an MPLS tunnel identification method and device as above noted.

FIG. 7A shows a format of an extended "Notification" message, in which as an event for notifying new tunnel identification information, "Tunnel setup" is added in "PW Status", and the tunnel identification information to be notified is added as a "Tunnel ID". The tunnel identification information to be notified is shown in FIG. 7B, in which each field is a known object used for the RSVP signaling.

As above noted, when the correspondence between pseudo wires and tunnels is set in the ingress node, the ingress node notifies MPLS tunnel identification information with the "Tunnel setup" message in the "Notification" message to the egress node (step S31, S32). It is to be noted that the "Tunnel setup" message includes PW identification information at "PW id FEC" (see FIG. 7A), so that the notification of the MPLS tunnel identification information is made concurrently with the notification of the PW identification information.

Namely, in the direction of node N1 to N2, the ingress node N1 notifies the identification information of the tunnel #1 corresponding to PW1 to the egress node N2 (step S31), whereby the egress node N2 identifies that PW1 corresponds to the tunnel #1 and updates the correspondence table 7. Similarly in the direction of node N2 to N1, the ingress node N2 notifies the identification information of the tunnel #3 corresponding to PW1 to the egress node N1 (step S32), whereby the egress node N1 identifies that PW1 corresponds to the tunnel #3 and updates the correspondence table 7.

Operation (2): FIG. 8

When a fault occurs at the tunnel #1 in the direction of node N1 to node N2, the operation shown in FIG. 8 will be performed, that is upon occurrence of a fault at the tunnel #1, the tunnel #1 is switched over to the protection tunnel #2 (step S41), so that the ingress node N1 autonomically passes PW1 through the tunnel #2. At the time of path switchover, the ingress node N1 updates its own correspondence table 7 and notifies the identification information of the tunnel #2 by using the "Tunnel setup" message in the "Notification" message to the egress node N2 (step S42). The egress node N2 having received the "Tunnel setup" message updates the correspondence table 7 from the tunnel #1 to #2.

Figure 9:
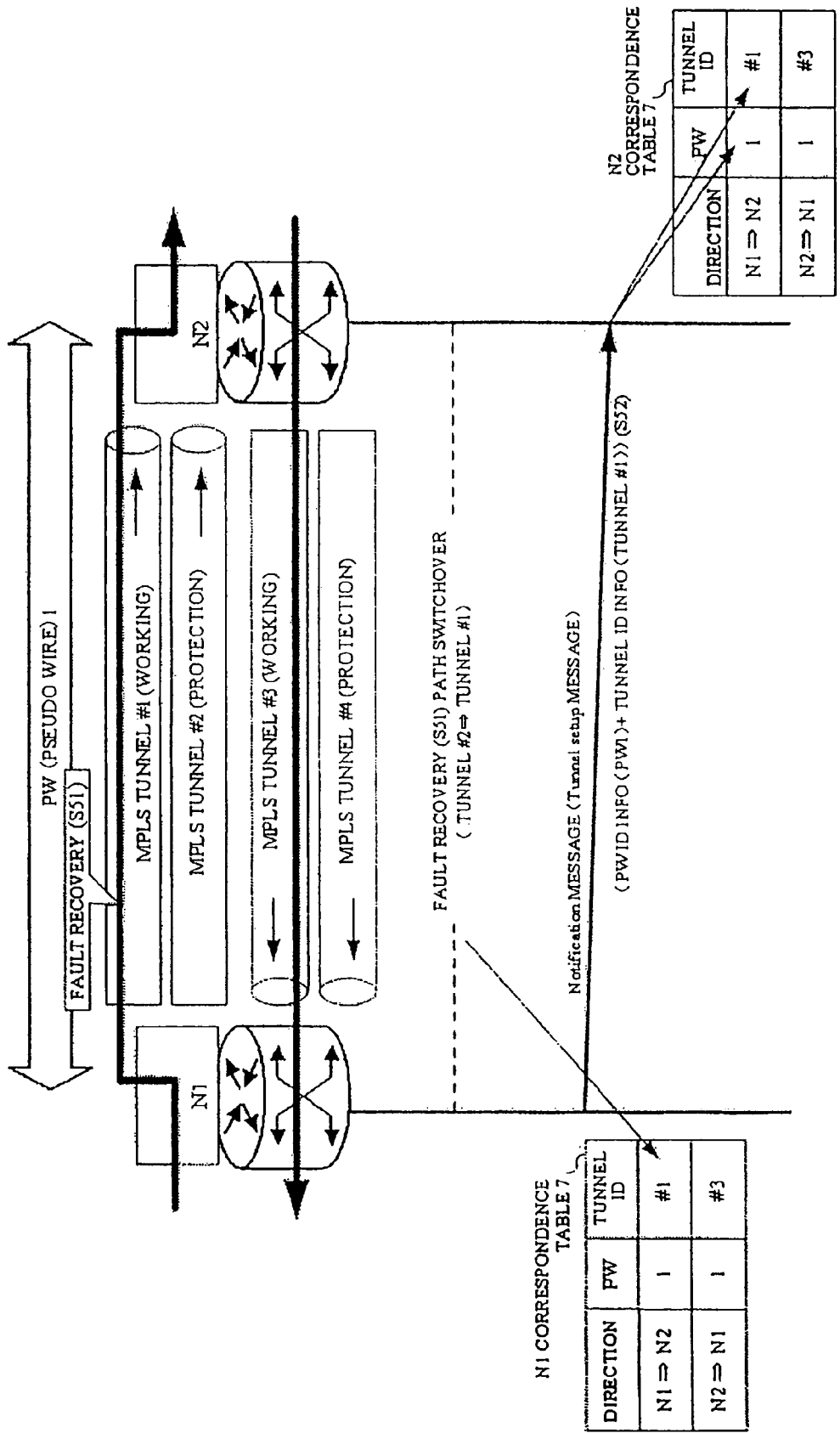
FIG. 9 is a sequence diagram showing an operation (3) of an MPLS tunnel identification method and device as above noted.

Operation (3): FIG. 9

When the tunnel #1 is recovered from the state in FIG. 8 as shown in FIG. 9 (step S51), a switchback operation from the tunnel #2 to #1 is performed. At the time of path switchover (step S51), the ingress node N1 notifies the identification information of the tunnel #1 by using the "Tunnel setup" message in the "Notification" message to the egress node N2 (step S52). The egress node N2 having received the "Tunnel setup" message updates the correspondence table 7 from the tunnel #2 to #1.

Figure 10:
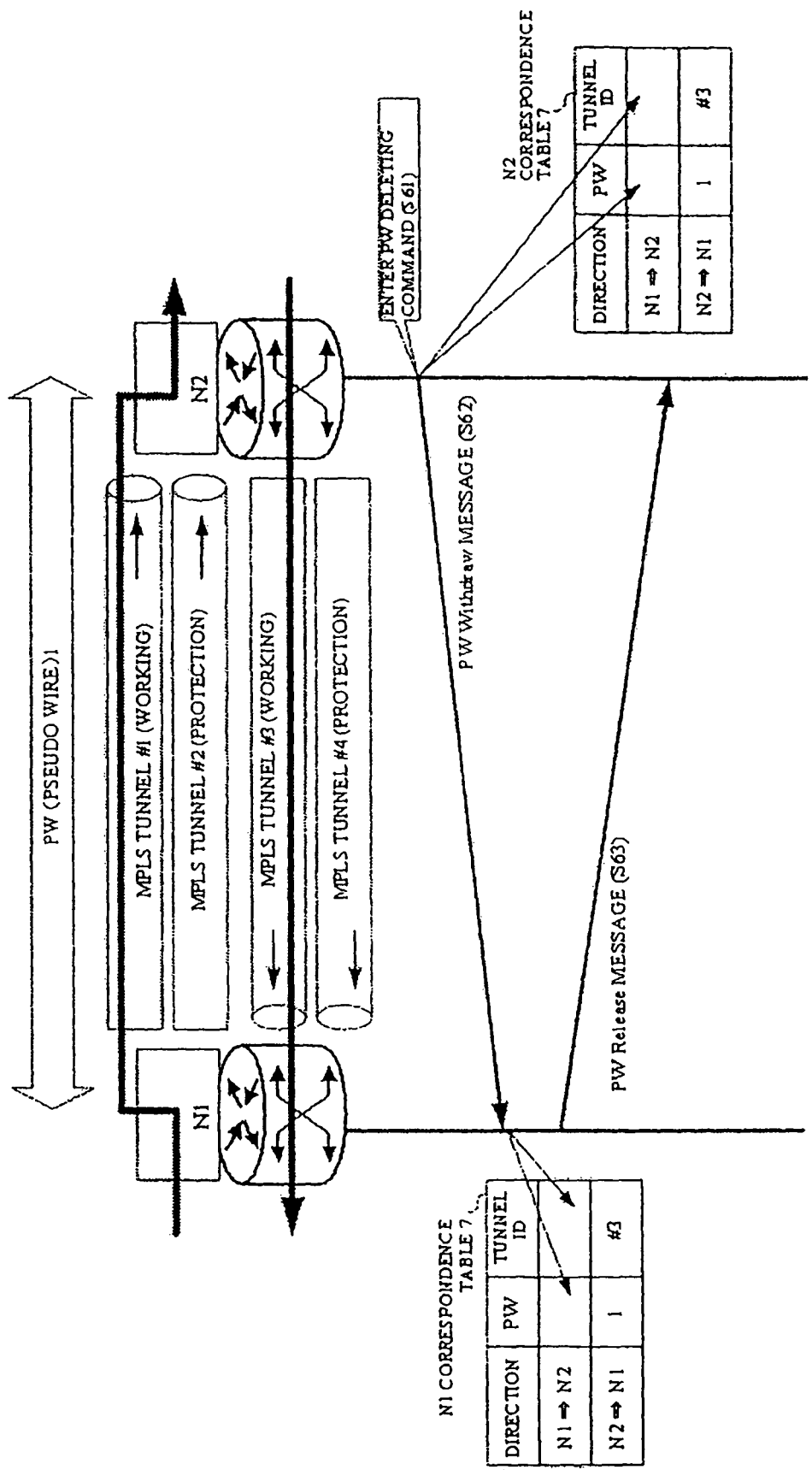
FIG. 10 is a sequence diagram showing an operation (4) of an MPLS tunnel identification method and device as above noted.
Figure 11:
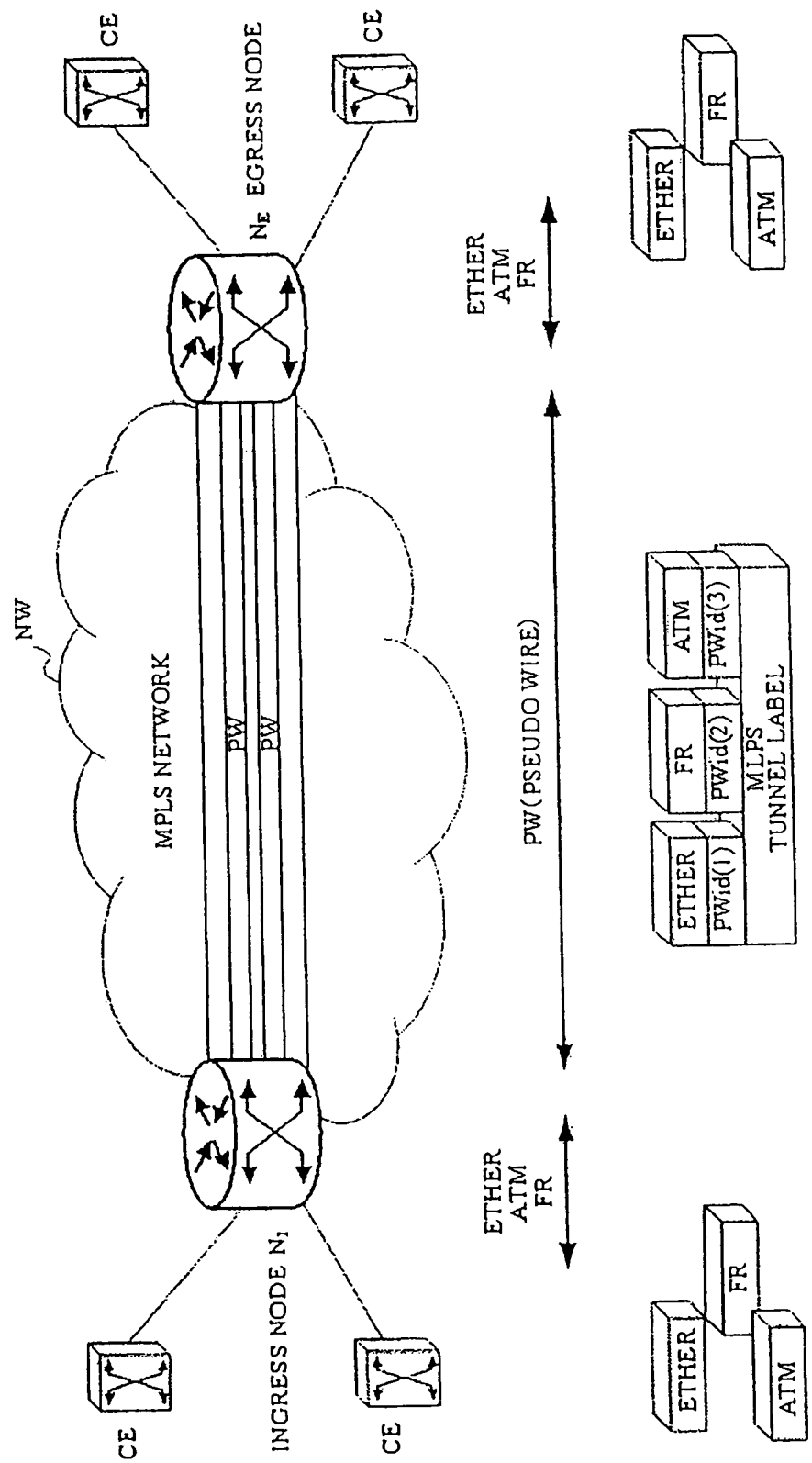
FIG. 11 is a diagram showing a generally known MPLS network.
Figure 12:
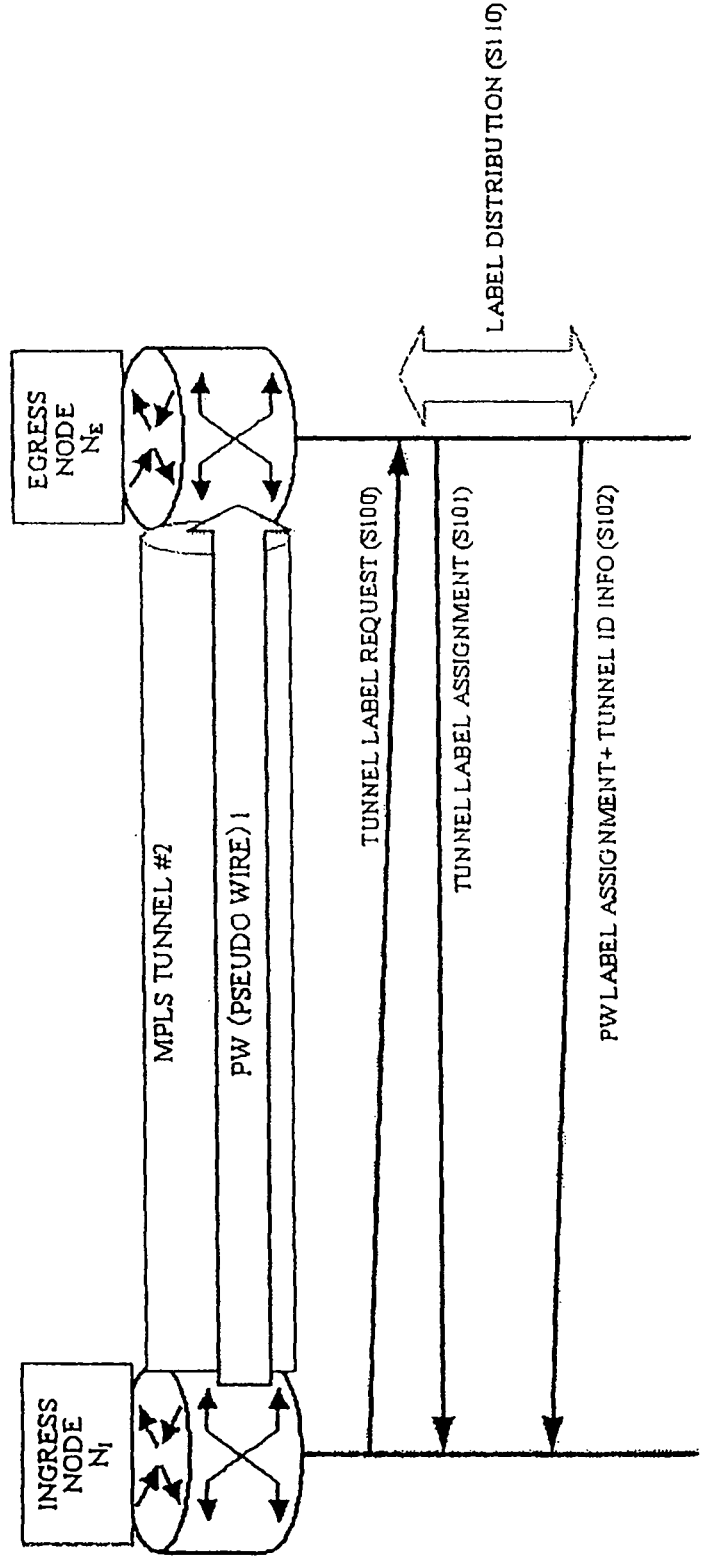
FIG. 12 is a sequence diagram showing an MPLS tunnel identification method of the related art.
Figure 13:
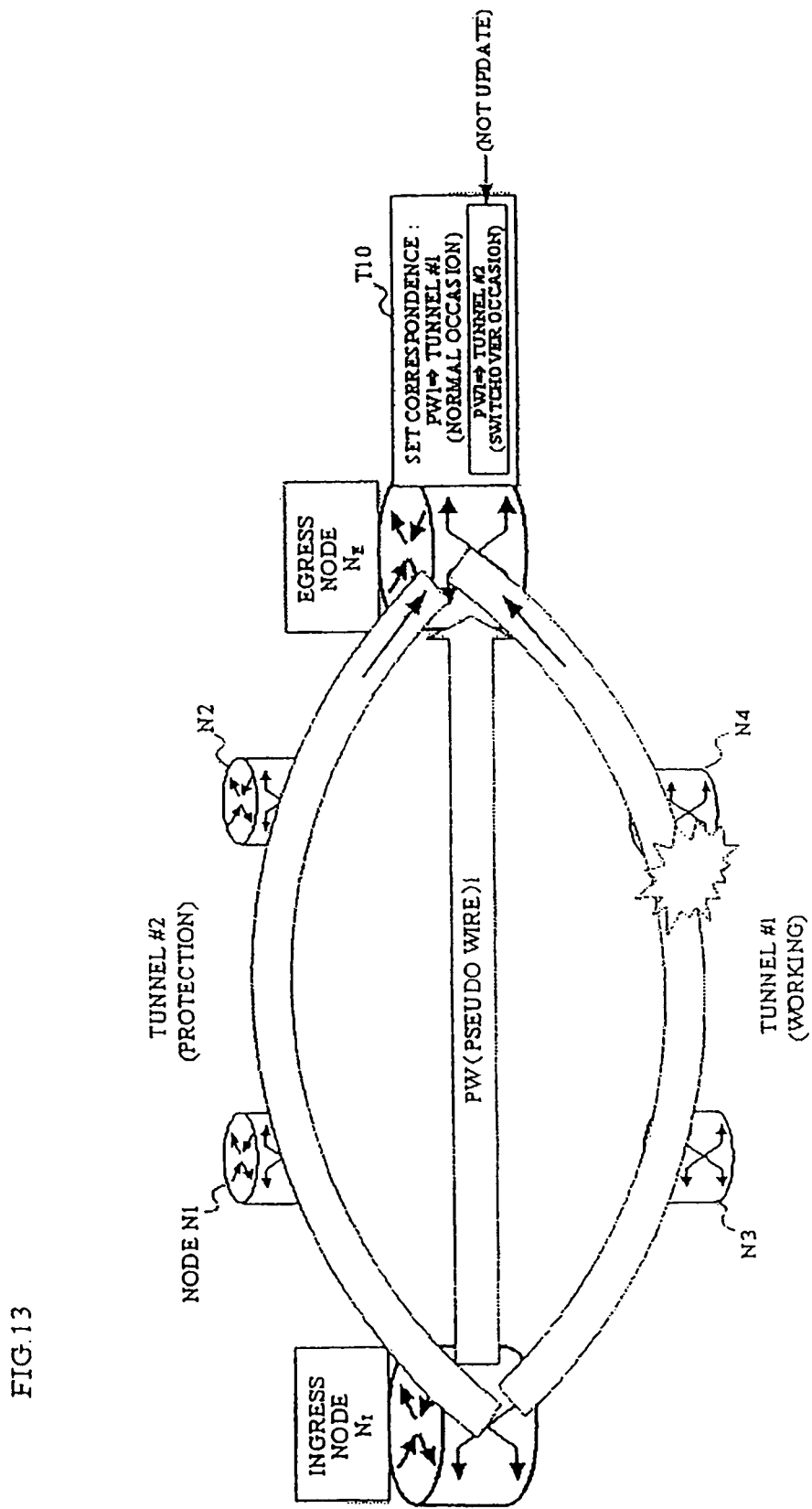
FIG. 13 is a diagram for explaining a problem of the related art.

Operation (4): FIG. 10

Upon entering a PW erasing command, the operation shown in FIG. 10 is performed. When the erasing command is entered at the node N2 (step S61), the information of "N1 to N2" in its own correspondence table is deleted. Then to the node N1, a known "PW Withdraw" message for erasing a PW label is transmitted (step S62). The node N1 having received the "PW Withdraw" message deletes the information of "N1 to N2" in the correspondence table 7, and notifies a known "PW Release" message to the node N2 (step S63).

It is also to be noted that the present invention is not limited by the above-mentioned embodiments, and it is obvious that various modifications may be made by one skilled in the art based on the recitation of the claims.

The invention claimed is:

1. A method for identifying a Multi-Protocol Label Switching (MPLS) tunnel, the method comprising the steps of:
    establishing, by a first node, MPLS tunnels with an second node;
    assigning, by the second node, a pseudo wire label to the first node, independently of the step of establishing, by a first node, MPLS tunnels with an opposing second node;
    determining, by the first node, an MPLS tunnel from among the established MPLS tunnels associated with a pseudo wire corresponding to the pseudo wire label; and
    notifying, by the first node, identification information of the determined MPLS tunnel together with identification information of the pseudo wire associated with the determined MPLS tunnel to the second node.

2. The method of claim 1, wherein the step of notifying is executed with a Notification message in a pseudo wire layer.

3. The method of claim 1, wherein the step of establishing comprises establishing a protection MPLS tunnel.

4. The method of claim 3, further comprising the step of switching, by the first node, the identification information of the determined MPLS tunnel over to identification information of the protection MPLS tunnel to be notified to the second node when the determined MPLS tunnel is switched over to the protection MPLS tunnel.

5. The method of claim 3, further comprising the step of switching, by the first node, the identification information of the protection MPLS tunnel back to the identification information of the determined MPLS tunnel to be notified to the second node when the protection MPLS tunnel is switched back to the determined MPLS tunnel.

6. The method of claim 1, further comprising the step of updating, by the first node, a correspondence between pseudo wire labels and MPLS tunnels to a correspondence between a new pseudo wire identification information and MPLS tunnel identification information when the identification information of the MPLS tunnel and the identification information of the pseudo wire are received from the second node.

7. The method of claim 6, further comprising the step of clearing, by the first node, the correspondence when an erasing command for the pseudo wire is received from the second node.

* * * * *